(12) United States Patent
Kataky et al.

(10) Patent No.: US 11,862,394 B2
(45) Date of Patent: Jan. 2, 2024

(54) ELECTROCHEMICAL CAPACITOR DEVICE WITH A BIOFILM

(71) Applicant: DURHAM UNIVERSITY, Durham (GB)

(72) Inventors: Ritu Kataky, Durham (GB); Karl Coleman, Durham (GB); Gary Sharples, Durham (GB)

(73) Assignee: DURHAM UNIVERSITY, Durham (GB)

( * ) Notice: Subject to any disclaimer, the term of this patent is extended or adjusted under 35 U.S.C. 154(b) by 319 days.

(21) Appl. No.: 17/423,824

(22) PCT Filed: Jan. 14, 2020

(86) PCT No.: PCT/GB2020/050066
§ 371 (c)(1),
(2) Date: Jul. 16, 2021

(87) PCT Pub. No.: WO2020/148523
PCT Pub. Date: Jul. 23, 2020

(65) Prior Publication Data
US 2022/0115187 A1    Apr. 14, 2022

(30) Foreign Application Priority Data

Jan. 16, 2019 (GB) ..................... 1900605

(51) Int. Cl.
*H01G 11/02* (2013.01)
*H01G 11/24* (2013.01)
(Continued)

(52) U.S. Cl.
CPC ............ *H01G 11/02* (2013.01); *H01G 11/04* (2013.01); *H01G 11/24* (2013.01); *H01G 11/26* (2013.01);
(Continued)

(58) Field of Classification Search
None
See application file for complete search history.

(56) References Cited

U.S. PATENT DOCUMENTS 9,274,059 B2    3/2016  Yu et al.
9,320,832 B2    4/2016  Joseoph et al.
(Continued)

FOREIGN PATENT DOCUMENTS

CN    105513835 A    4/2016
CN    106974765 A    7/2017
(Continued)

OTHER PUBLICATIONS

Farahani, M., and Shafiee, A., "Wound Healing: From Passive to Smart Dressings", Advanced Healthcare Maerials, 2021, <https://doi.org/10.1002/adhm.202100477> [Retrieved Sep. 16, 2021] pp. 1-32.
(Continued)

*Primary Examiner* — Eric W Thomas
(74) *Attorney, Agent, or Firm* — CHRISTENSEN O'CONNOR JOHNSON KINDNESS PLLC

(57) ABSTRACT

An electrochemical capacitor (300) for use with a biofilm is presented. The electrochemical capacitor includes a first electrode (324) coupled to a first porous layer (326), a second electrode (334) coupled to a second porous layer (336); and an electrolyte (310) provided between the first porous layer (326) and the second porous layer (336). At least one of the first porous layer (326) and the second porous layer (336) has a plurality of cavities adapted to receive redox-active metabolites produced by the biofilm. Also presented is an electrochemical capacitor device, such as a skin patch that includes a support layer attached to the electrochemical capacitor (300). Also presented is a power source that includes the electrochemical capacitor (300) and a biofilm provided between the first electrode (324) and the (Continued)

second electrode (334) of the electrochemical capacitor (300).

20 Claims, 13 Drawing Sheets

(51) Int. Cl.
  *H01G 11/26* (2013.01)
  *H01G 11/36* (2013.01)
  *H01G 11/46* (2013.01)
  *H01G 11/04* (2013.01)
  *H01G 11/10* (2013.01)
(52) U.S. Cl.
  CPC ............ *H01G 11/36* (2013.01); *H01G 11/46* (2013.01); *H01G 11/10* (2013.01)

(56) References Cited

U.S. PATENT DOCUMENTS

| | | | |
|---|---|---|---|
| 10,316,348 | B2 | 6/2019 | Goluch et al. |
| 10,329,678 | B2 | 6/2019 | Bouchez et al. |
| 2007/0059295 | A1 | 3/2007 | Wang et al. |
| 2008/0160384 | A1 | 7/2008 | Iqbal et al. |
| 2008/0281244 | A1 | 11/2008 | Jacobs |
| 2010/0203360 | A1 | 8/2010 | Kim et al. |
| 2010/0233021 | A1 | 9/2010 | Sliwa et al. |
| 2011/0135967 | A1 | 6/2011 | Pellissier et al. |
| 2014/0107740 | A1 | 4/2014 | Crisp |
| 2015/0287543 | A1* | 10/2015 | Aksay .................... B82Y 40/00 252/182.1 |
| 2015/0364783 | A1 | 12/2015 | Stanley et al. |
| 2016/0006039 | A1 | 1/2016 | Cosnier et al. |
| 2016/0036083 | A1 | 2/2016 | Solina |
| 2016/0145669 | A1 | 5/2016 | Curchoe et al. |
| 2016/0172123 | A1* | 6/2016 | Yang .................... H01G 11/36 29/25.03 |
| 2017/0020390 | A1 | 1/2017 | Flitsch et al. |
| 2020/0163801 | A1 | 5/2020 | Nie |

FOREIGN PATENT DOCUMENTS

| | | |
|---|---|---|
| CN | 105513835 B | 7/2018 |
| EP | 3322451 A4 | 5/2018 |
| JP | 2017-522698 A | 8/2017 |
| WO | 93/03789 A1 | 3/1993 |
| WO | 2005/025447 A2 | 3/2005 |
| WO | 2012/149487 A1 | 11/2012 |
| WO | 2013/032961 A1 | 3/2013 |
| WO | 2016011393 A1 | 1/2016 |
| WO | 2016/089769 A2 | 6/2016 |
| WO | 2017/035318 A1 | 3/2017 |
| WO | 2018/075893 A1 | 4/2018 |

OTHER PUBLICATIONS

Amade, R., et al., "Vertically Aliged Carbon Nanotubes Coated With Manganese Dioxide as Cathode Material for Microbial Fuel Cells," J Mater Sci 50:2114-2320, published online Oct. 2014.

Banerjee, J., et al., "Improvement of Human Keratinocyte Migration by a Redox Active Bioelectric Dressing," PLoS One 9(3):e8239, Mar. 2014, 14 pages.

Barki, K.G., et al., "Electric Field Based Dressing Disrupts Mixed-Species Bacterial Biofilm Infection and Restores Functional Wound Healing," Annals of Surgery 269(4):756-766, Nov. 2017.

Boateng, J.S., et al., "Wound Healing Dressings and Drug Delivery Systems: A Review," Journal of Pharmaceutical Sciences 97(8):2892-2923, Aug. 2008.

Cosnier, S., et al., "An Easy Compartment-Less Biofuel Cell Construction Based on the Physical Co-Inclusion of Enzyme and Mediator Redox Within Pressed Graphite Discs," Electrochemistry Communications 12(2):266-269 Feb. 2010.

Costerton, J. W., et al., "Mechanism of Electrical Enhancement of Efficacy of Antibiotics in Killing Biofilm Bacteria," Antimicrobial Agents and Chemotherapy 38(12):2803-2809, Dec. 1994.

Hulsheger, H., et al., "Killing of Bacteria with Electric Pulses of High Field Strength," Radiat Environ Biophys 20:53-65, 1981.

International Search Report and Written Opinion dated May 13, 2020, issued in corresponding International Application No. PCT/GB2020/050066, filed Jan. 14, 2020, 11 pages.

Lin, S., et al., "Stretchable Hydrogel Electronics and Devices," Adv Mater 28(22)4497-4505, Jun. 2016.

McLister, A., et al., "Electrochemical Approaches to the Development of Smart Bandages," Electrochemistry Communications 40:96-99, Mar. 2014.

Munteanu, F-D., et al., "Detection of Antibiotics and Evaluation of Antibacterial Activity With Screen-Printed Electrodes," Sensors 18:901, Mar. 2018, 26 pages.

Petrofsky, J., et al., "Effect of Electrical Stimulation on Bacterial Growth," accessible online at <https://www.researchgate.net/publication/254207375_Effect_of_Electrical_Stimulation_on_Bacterial_Growth> [accessed Jul. 16, 2021].

Santoro, C., et al., "Supercapacitive Microbial Desalination Cells: New Class of Power Generating Devices for Reduction of Salinity Content," Applied Energy 208:25-36, available online Oct. 2017.

Search Report of the Intellectual Property Office dated Jun. 26, 2019, issued in GB Application No. 1900605.5, filed Jan. 16, 2019, 4 pages.

Stoodley, P., et al., "Influence of Electric Fields and pH on Biofilm Structure as Related to the Bioelectric Effect," Antimicrobial Agents and Chemotherapy 41(9):1876-1879, Sep. 1997.

Sultana, S.T., et al., "Electrochemical Biofilm Control: A Review," Biofouling 31(0):745-758, published online Nov. 2015, 25 pages (Author manuscript).

Ud-Din, S., et al., "Angiogenesis Is Induced and Wound Size Is Reduced by Electrical Stimulation in an Acute Wound Healing Model in Human Skin," PLoS One 10(4):e0124502, published online Apr. 2015, 22 pages.

Wang, J., et al., Microfabricated Electrochemical Cell-Based Biosensors for Analysis of Living Cells In Vitro, Biosensors 2:127-170, Jun. 2012.

Rabaey et al., "Microbial fuel cells: novel biotechnology for energy generation", Trends in Biotechnology, Jun. 2005, 9 pages, vol. 23 No. 6, www.sciencedirect.com.

* cited by examiner

ELECTROCHEMICAL CAPACITOR DEVICE WITH A BIOFILM

CROSS-REFERENCES TO RELATED APPLICATIONS

This application is a National Stage of International Application No. PCT/GB2020/050066, filed Jan. 14, 2020, which claims the benefit of United Kingdom Application No. 1900605.5, filed Jan. 16, 2019, the entire disclosures of which are hereby incorporated by reference herein for all purposes.

TECHNICAL FIELD

The present disclosure relates to an electrochemical capacitor device for use with a biofilm.

BACKGROUND

Biofilm growth may be controlled using various electrochemical techniques. A comprehensive review of such techniques is provided in Biofouling, volume 31, 2015-Issue 9-10, pages 745-758 titled "Electrochemical biofilm control: a review" by Sujala T. Sultana et al. A first approach seeks to delay bacterial cells attachment onto a surface by polarizing the surface with a negative charge hence creating a repulsive force between the bacterial cells and the surface. Another approach is based on the creation of biocides such as reactive oxygen species that can be used to eradicate the bacteria. Such approaches however have limited reliability.

The present disclosure relates to a pseudo capacitor for use with a bacterial biofilm. Pseudo-capacitors also known as faradaic supercapacitors are characterised by rapid charge and discharge cycles. Typically, a charge and discharge cycle may occur in less than one second. As such pseudo-capacitors may be used in applications requiring short burst of powers, for instances pulses in the millisecond range.

Pseudo-capacitors use redox active materials for charge storage. During charging, reversible and fast faradic reactions occur across the double layer on the electrode surface. A high accessible specific surface area and the thinness of the double layer ensure devices with higher specific capacitance compared to traditional capacitors.

The charge storage mechanisms depend on the electrode material and the electrolyte used. Conducting polymers use reversible electrochemical doping into the 3D structure of the polymer to store charge. The electrolyte ions move into the polymer after it is oxidised or reduced by the electrode. The specific capacitance and energy density of a pseudo-capacitor usually exceeds that of electrical double layer capacitors by ten to a hundred times.

SUMMARY

According to a first aspect of the disclosure, there is provided an electrochemical capacitor for use with a biofilm, the electrochemical capacitor comprising a first electrode coupled to a first porous layer, a second electrode coupled to a second porous layer, and an electrolyte provided between the first porous layer and the second porous layer; wherein at least one of the first porous layer and the second porous layer comprises a plurality of cavities adapted to receive redox-active metabolites produced by the biofilm.

For instance, the redox-active metabolites may be phenazines or phenazine derivative molecules.

Optionally, the electrochemical capacitor comprises a pseudocapacitance and a double-layer capacitance.

Optionally, the first and second electrodes may be carbon-based. For example, the first and second electrodes may comprise graphite or carbon nanotubes.

Optionally, the cavities have an average diameter ranging from about 0.2 µm to about 10 µm.

Optionally, the first and second porous layers comprise a gel or a polymer.

Optionally, the first and second porous layers comprise a nanomaterial. For example, the nanomaterial may comprise carbon nanoparticles or metallic nanoparticles such as gold, copper or silver nanoparticles.

Optionally, the gel may be a polyvinyl alcohol gel.

Optionally, at least one of the first and second porous layers comprise graphene oxide.

Optionally, the first electrode is an anode and the second electrode is a cathode.

Optionally, the first porous layer comprises a redox mediator. For instance, the redox mediator may be a metal oxide redox mediator or an organometallic compound such as Ferrocene. Examples of metal oxide mediators include Manganese oxides, Copper oxides, and Iron oxides.

Optionally, the redox mediator is may be manganese dioxide.

Optionally, the electrolyte is a biocompatible electrolyte compatible with the formation of the biofilm.

Optionally, the electrolyte is a gel. For instance the electrolyte may be a bacterial gel.

Optionally, the gel comprises at least one of glucose and citrate.

Optionally, the electrolyte comprises an ionic liquid.

Optionally, at least one of first and second porous layers comprises an ionic liquid.

According to a second aspect of the disclosure, there is provided an electrochemical capacitor device comprising a support layer attached to an electrochemical capacitor according to the first aspect. For instance, the electrochemical capacitor device may be a skin patch.

Optionally, the electrochemical capacitor device comprises a plurality of interdigitated electrodes forming a plurality of electrochemical capacitors.

Optionally, the electrochemical capacitor device is a skin patch, and the support layer is adapted to provide adhesion to a skin region of a subject.

The electrochemical capacitor device according to the second aspect of the disclosure may comprise any of the features described above in relation to the electrochemical capacitor of the first aspect.

According to a third aspect of the disclosure, there is provided a power source comprising an electrochemical capacitor according to the first aspect and a biofilm provided between the first electrode and the second electrode of the electrochemical capacitor.

The power source according to the third aspect of the disclosure may comprise any of the features described above in relation to the electrochemical capacitor of the first aspect.

According to a fourth aspect of the disclosure, there is provided a wearable device comprising a power source according to the third aspect.

For example, the wearable device may be a biocompatible implantable device.

The wearable device according to the fourth aspect of the disclosure may comprise any of the features described above in relation to the power source of the third aspect.

DESCRIPTION

The disclosure is described in further detail below by way of example and with reference to the accompanying drawings, in which:

FIG. 4 (b) is a magnified view of the porous redox layer of FIG. 4(a);

Figure 1:
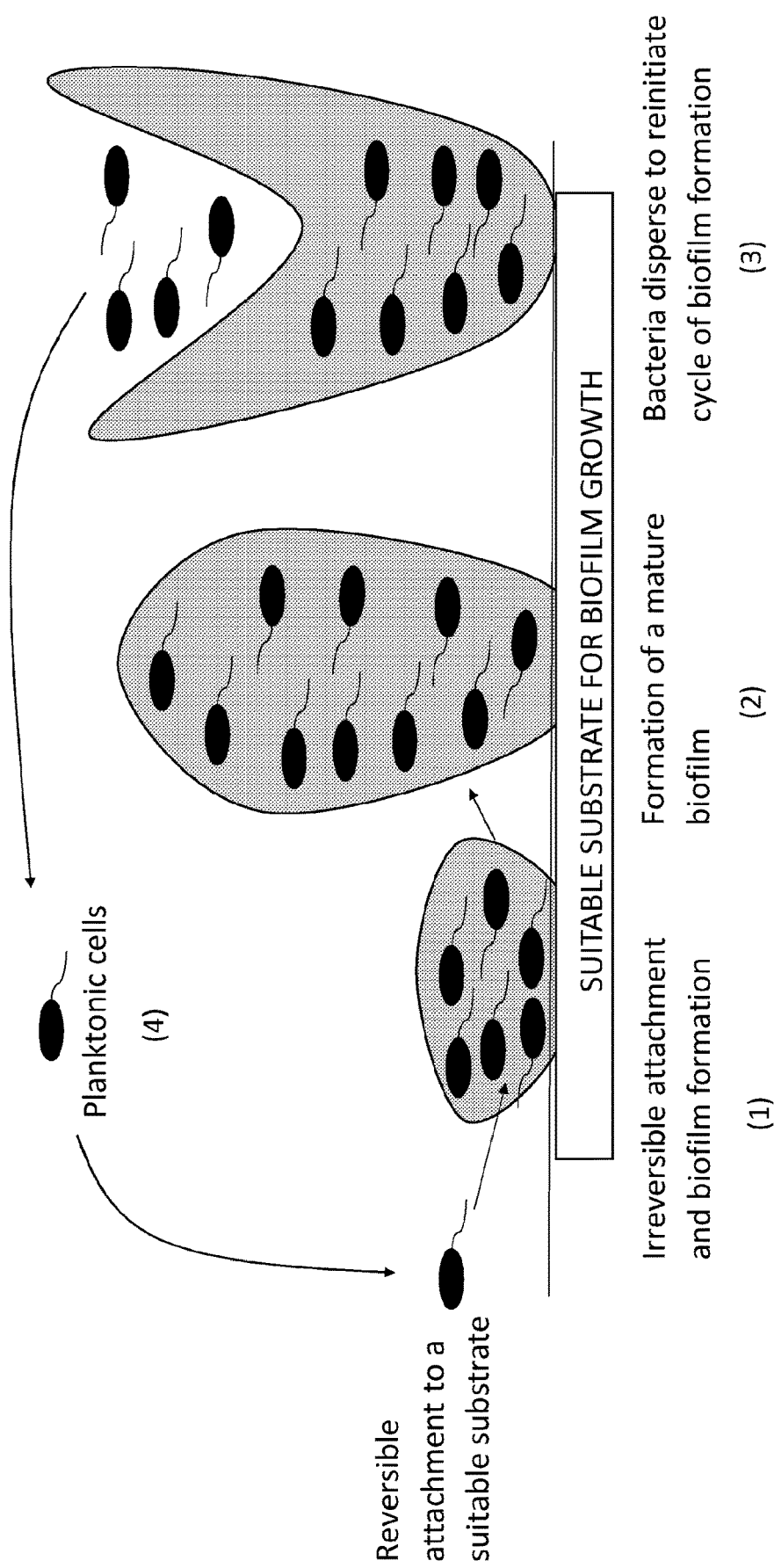
FIG. 1 is a diagram illustrating biofilm formation.

FIG. 1 is a diagram illustrating the formation of a biofilm. Initially, a few bacteria or Planktonic cells attach to a substrate that is suitable for biofilm growth such as a carbon-based porous substrate. In a second stage a mature biofilm is formed. Eventually, in a third stage the biofilm releases bacteria. In turn the dispersed bacteria may attach to the substrate to form another biofilm. The bacteria produce a wide variety of redox-active metabolites. For instance, many bacteria, such as Pseudomonas produce phenazines and phenazines derivatives.

Figure 2:
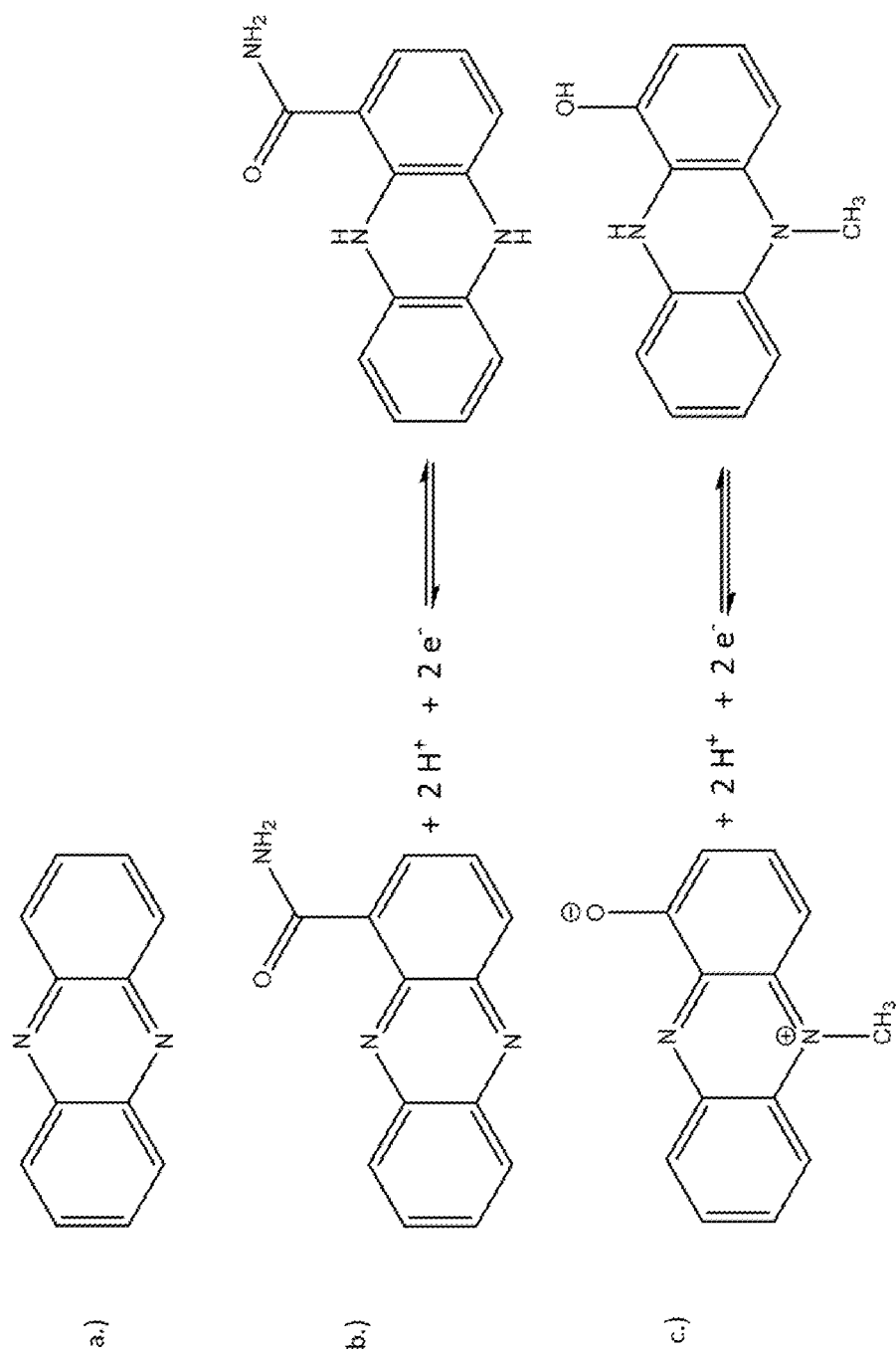
FIG. 2(a) is the backbone molecular structure of a phenazine molecule.
FIG. 2(b) is the redox reaction of phenazine-1-carboxamide.
FIG. 2(c) is the redox reaction of pyocyanin.

FIG. 2 illustrates the oxidoreduction reactions of phenazine derivatives. FIG. 2(a) shows the backbone molecular structure of a phenazine molecule. FIG. 2(b) shows the redox reaction of phenazine-1-carboxamide at pH7. FIG. 2(c) shows the redox reaction of pyocyanin at pH 7.

Figure 3:
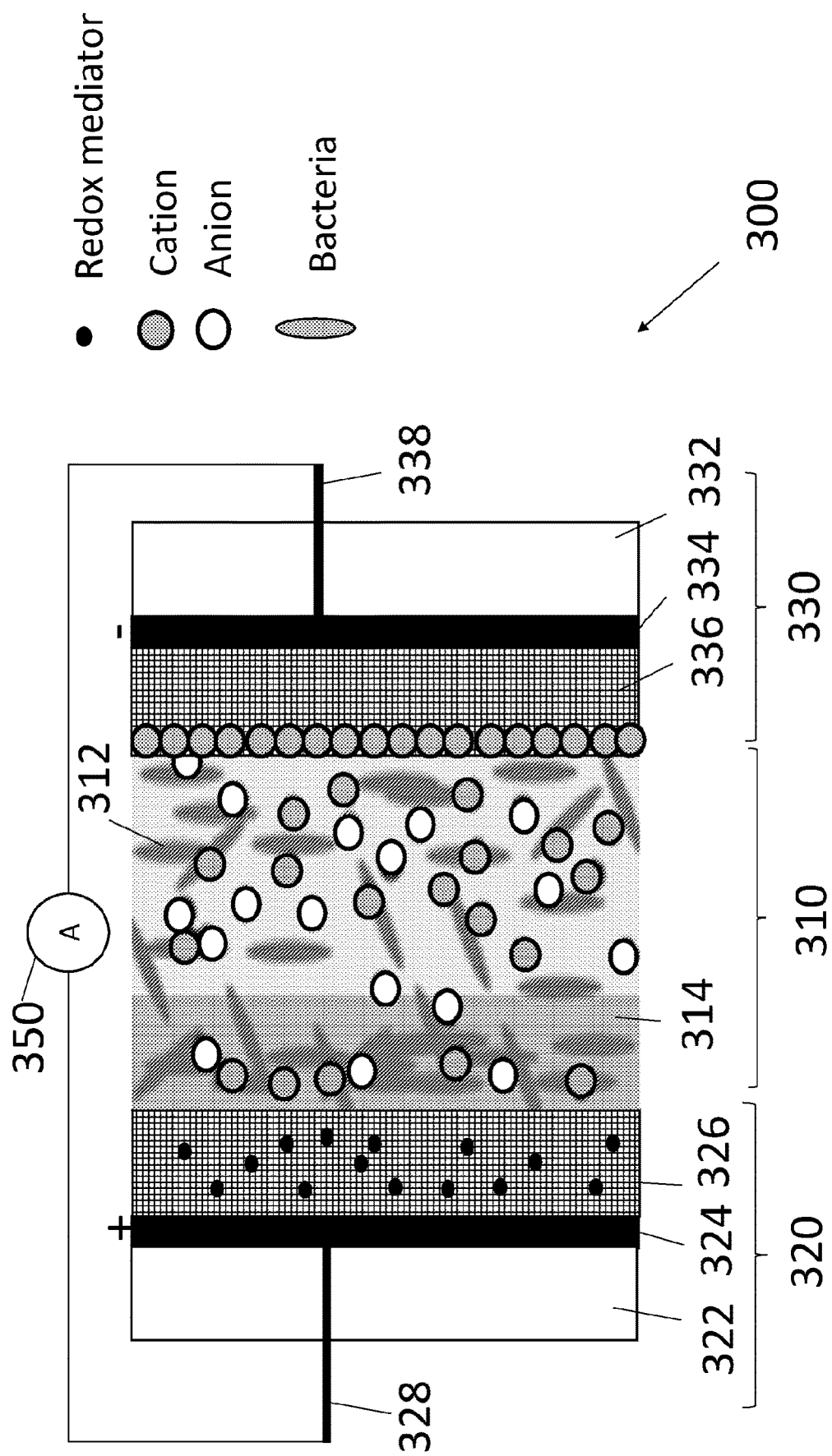
FIG. 3 is a cutaway side view of an electrochemical capacitor for use with a biofilm.

FIG. 3 is a cutaway side view of an electrochemical capacitor 300 for use with a biofilm. The electromechanical capacitor 300 has a structure providing for both a pseudo-capacitance and a double-layer capacitance; and may be referred to as a pseudo capacitor or a faradaic supercapacitor.

The electrochemical capacitor 300 includes an electrolyte layer 310 sandwiched between a first stack 320 and a second stack 330. It will be appreciated that the diagram of FIG. 3 is not a scaled representation of the supercapacitor and that the relative size of each layers relative to each other may vary depending specific applications.

The first stack 320 may be formed by a first electrode 324 provided between a first substrate 322 and a first porous redox active layer 326. A first pin 328 extends through the first substrate 322 and through a portion of the first electrode 324 to provide electrical contact to the electrode 324. Similarly, the second stack 330 may be formed by a second electrode 334 provided between a second substrate 332 and a second porous redox active layer 336. A second pin 338 extends through the second substrate 332 and through a portion of the second electrode 334 to provide electrical contact to the electrode 334.

A current source 350 may be coupled to the first and second pins 328 and 338 to provide a charging current I_charge. For instance, the first electrode 324 may be an anode and the second electrode 334 may be a cathode. The electrolyte layer 310 may be a biocompatible solution or a biocompatible gel. For instance, the electrolyte may be a gel such as a glucose and citrate gel or a bacterial gel allowing a formation of a biofilm. Alternatively the electrolyte may be provided by citrate or an ionic liquid or an inorganic salts or buffer or other bacterial growth media. The electrolyte 310 should be electrochemically stable and preferably have a wide potential window.

The supercapacitor may be designed as a flexible and biocompatible device. For instance, the first and second stacks 320, 330 may be made of flexible materials. A separator, such as a porous film, may be provided between the first stack 320 and the second stack 330.

The substrate layers 322 and 332 may be flexible membranes such as polyurethane based membranes. The electrodes 324, 334 may comprise a carbon-based material such as graphite. The porous redox active layers 326, 336 may be formed by a gel such as a hydrogel or polymer matrix that includes a nanomaterial such as a carbon nanoparticle or a metallic nanoparticle. Example of suitable nanoparticles may be gold, copper or silver nanoparticles. A polymer matrix may include polyurethane.

In the layer 326 provided at the anode, the nanomaterial can be linked physically or chemically with a redox mediator such as a metal oxide redox mediator. Examples of metal oxide mediators include Manganese oxides, Copper oxides, Iron oxides and ferrocenes. If graphene oxide is used a mediator may not be required. The porous redox active layer 326 is pseudocapacitive and can store charges. The porous redox active layer 336 provided at the cathode does not contain a mediator.

The redox porous layers 326 and 336 have cavities allowing the biofilm to attach to the layer 326. For instance, the cavities may have a size that is in the order of the size of a bacterium, for example the cavities may have an average diameter ranging from about 0.2 µm to about 10 µm.

For instance, an active layer may be formed by a silanized polyvinyl alcohol gel (PVA) incorporated with graphene oxide or gold. Graphene oxide (GO) for instance may be dissolved into a hydrogel gel network. This biocompatible material provides good electrical conductivity, high young's modulus, large specific area and stability for wide temperature range.

The energy E stored in the supercapacitor may be expressed as a function of the capacitance C, and the potential window V as:

$$E = \tfrac{1}{2}CV^2 \qquad (1)$$

The power density of the device is proportional to the square of the voltage, as $$P = V^2/4R_s \qquad (2)$$

In which $R_s$ is the internal resistance of the supercapacitor.

The ions in the electrolyte 310 should preferably be present in high enough concentration and the solvated ionic radius of the ions should be small so as to exploit all available pores in the electrode structure. The electrolyte 310 should have suitable mechanical properties such as low viscosity and volatility.

Commonly used aqueous electrolytes such as potassium hydroxide KOH or sulfuric acid $H_2SO_4$, are unsuitable for biocompatible devices. In order to optimise the electrolyte solution an imidazolium cation-based Room Temperature Ionic Liquid (RTIL) with bromide counter ion may be used. The RTIL allows increasing the voltage window and stabilises the glucose/citrate gel in silanized polyvinyl alcohol gels (PVA). The RTIL provided in the GO/PVA composite is also used to induce pore opening.

In operation, the negatively charged bacteria grow a biofilm 314 on the porous layer 326 coupled to the anode 324. The biofilm 314 releases electrons from redox active groups molecules such as phenazines. The electrons may be stored in the layer 326. The circuit starts pulsing when redox reactions and electron transfer occurs. The circuit keep pulsing as long as there is enough metabolites present in the electrolyte 310.

Below is an exemplary protocol for making a supercapacitor of 2 mm thickness by sandwiching an electrolyte gel between two stacks, each stack comprising two layers, layer 1 and layer 2, on a flexible thin film.

The electrode layer, layer 1, is obtained by mixing 2.86 g of Tecoflex SG 80 with 15 ml of Tetrahydrofuran (THF). The mixture is then heated to form a clear and viscous liquid melt. Once cooled, 64 mg of graphite powder (particle size of 40 micrometres) is added together with 200 µl of 1-ethyl-3-methyl imidazolium bromide (IL-EMImBr) and mixed with the melt to form the electrode layer. Alternatively, other RTILs may be used such as 1-butyl-3-methylimidazolium bis(trifluoromethane) sulfonimide (or nitrate).

The porous redox layer, layer 2, is obtained by first dispersing 100 mg of dried Graphene oxide (GO) and 200 µl of IL-EMImBr in 15 ml of distilled water and then by sonicating the solution for 4 hours. This dispersion is then slowly added to a Polyvinyl alcohol (PVA) solution prepared by dissolving 3.25 g of PVA in 85 ml distilled water at 90° C. and cooled to 50° C. Graphene oxide GO may be prepared using the Hummers method. Alternatively the Graphene oxide may be replaced by metallic nanoparticles such as gold, copper or silver nanoparticles.

The gel electrolyte may be obtained by adding 2 g of glucose or sodium citrate dehydrate and 75 ml of IL-EMImBr to a solution of PVA cooled to 50° C. A platinum point wire is then inserted into the electrode layer for providing electrical connections.

Figure 4:
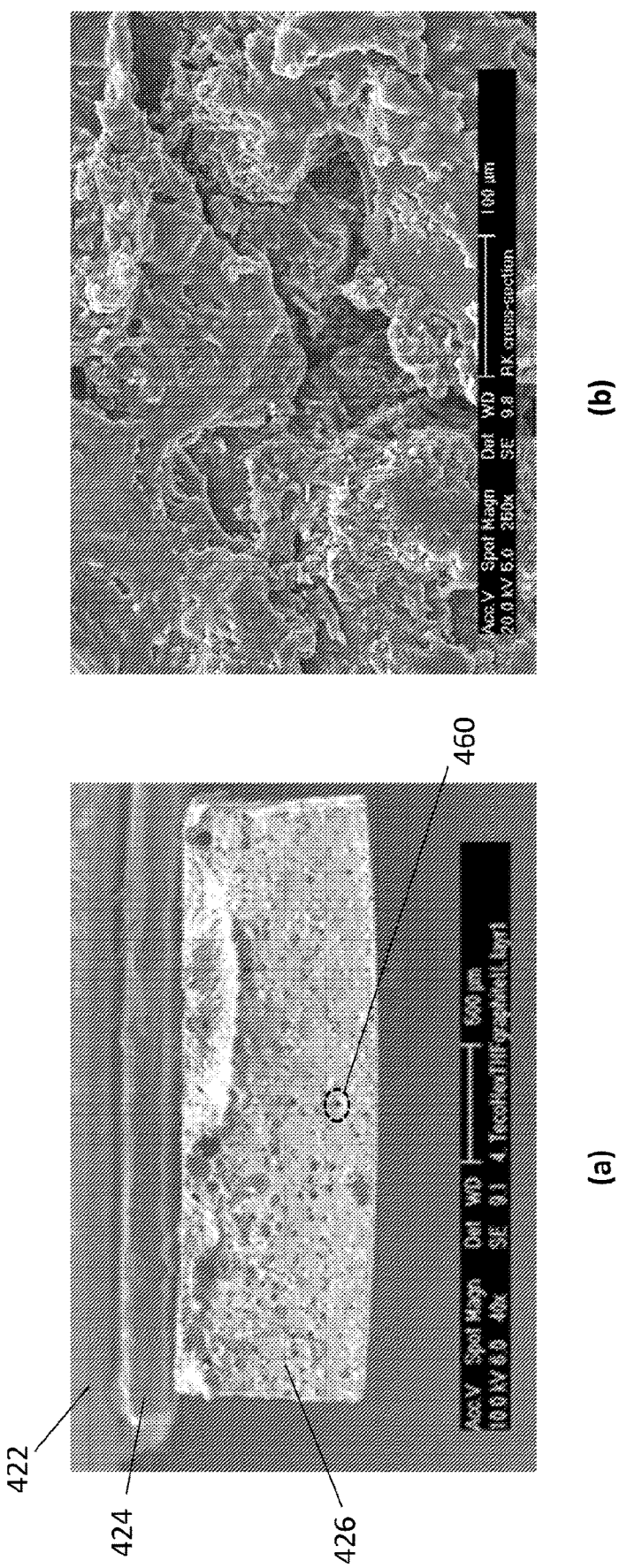
FIG. 4 (a) is a scanning microscopy image of an electrode layer coupled to a porous redox layer.

FIG. 4 shows a scanning microscopy image of the electrode layer 424 (layer 1) and the porous redox layer 426 (layer 2). The ions present in the electrolyte form electrostatic double-layers of opposite polarity. For instance, a double-layer forms at the interface between the electrolyte and the porous layer 426. The double-layer capacitance contributes to the total capacitance of the supercapacitor.

In addition, the porous layer 426 is adapted to perform Faradaic electron charge transfer with redox reactions. The Faradaic reactions can arise from a biocompatible redox reaction for example glucose or from the biofilm itself. The electrochemical capacitance also contributes to the total capacitance of the supercapacitor. For instance, if the electrolyte is a glucose electrolyte, then the porous matrix 426 allows diffusion of glucose within the layer 426. This permits glucose to be reduced into gluconic acid at the electrode 424 by GO, present in the porous matrix 426.

Upon formation of a biofilm, additional reactions may take place. The porous redox active layer 426 includes a large number of pores also referred to as channels 460. The size of these pores or channels is sufficient to allow redox-active metabolites such as phenazines and phenazines derivatives to penetrate the layer 426 and reach the electrode 424. In turn the redox-active metabolites may be reduced or oxidized. For example the channels may have an average diameter ranging from about 0.2 µm to about 10 µm.

The performance of the supercapacitor may be checked using various techniques that includes Cyclic Voltametry (CV), charge and discharge at short time scales and electrical impedance spectroscopy (EIS).

Figure 5:
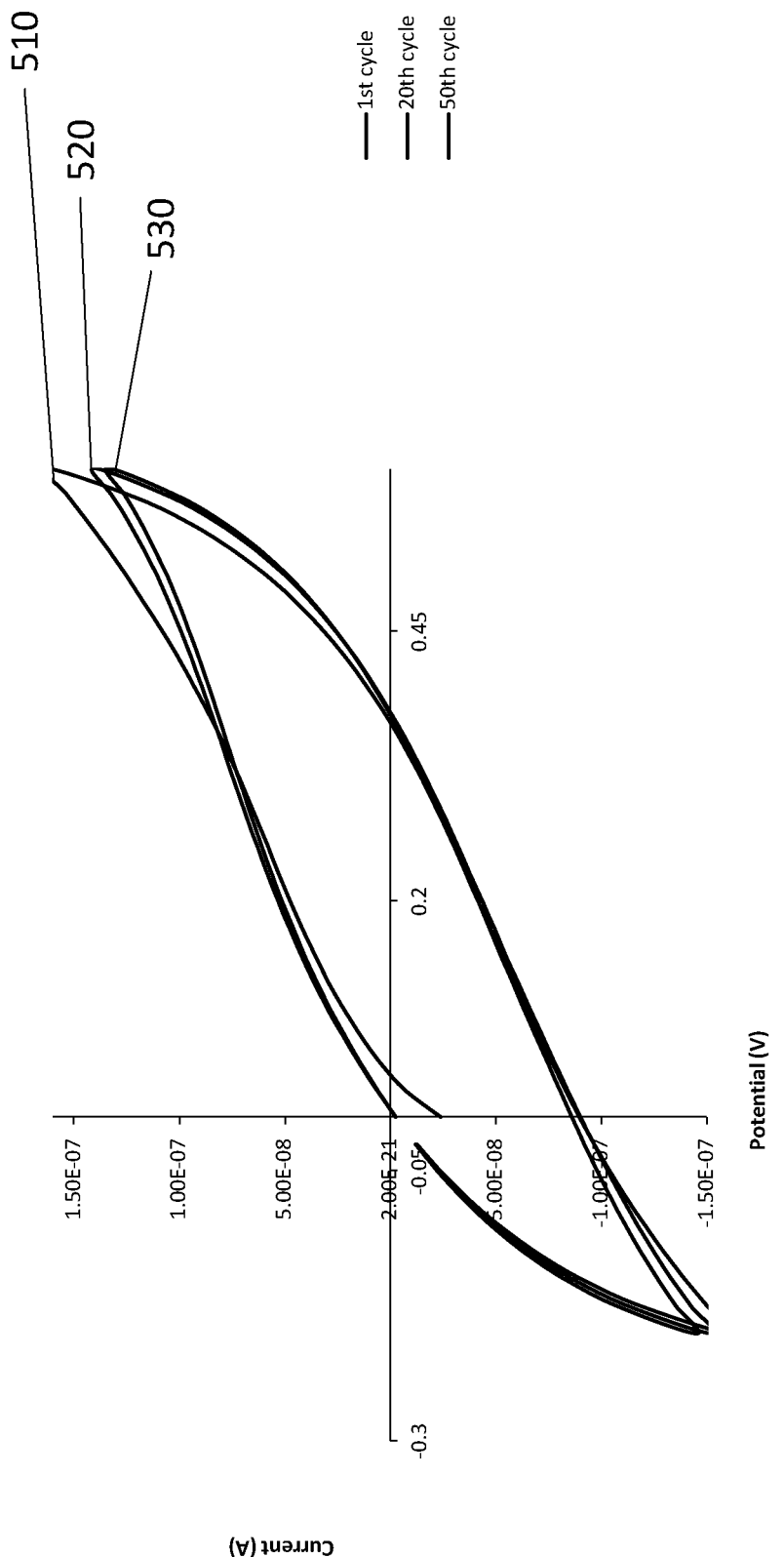
FIG. 5 is a set of cyclic voltammograms of a supercapacitor.

FIG. 5 illustrates the cyclic voltammograms of a supercapacitor obtained after one cycle, 510, 20 cycles 520 and 50 cycles. The cyclic voltammograms show a reversible waveform. The capacitance of the super capacitor may be calculated using the following equation:

$$C = \frac{1}{2v(V_f - V_i)} \int_{V_i}^{V_f} I(V)dV, \quad (3)$$

in which C is the capacitance in Farad, $V^f$ and $V_i$ are the limits of the potential window in Volts, v is the scan rate in $Vs^{-1}$ and I is the current in Amperes. Ideal supercapacitor's have rectangular cyclic voltammograms. Deviation from this rectangular shape indicates the presence of some pseudocapacitive behaviour.

The capacitance calculated using equation (3) was 0.17, 0.11, 0.07, 0.03, 0.02 µF/cm² for scan rates of 20, 50, 100, 250 and 500 mVs⁻¹ respectively. Therefore, the capacitance decreases with increased scanned rates indicating increasing diffusion resistance for ionic motion into electrode pores at higher sweep rates. Calculation of capacitance using equation (3) showed very little change in capacitance between 25th and 50th cycle, demonstrating good life cycle of the supercapacitor. Any change in capacitance is attributed to charge consumption due to Faradic reactions with unbounded functional groups at electrode/electrolyte surfaces.

Figure 6:
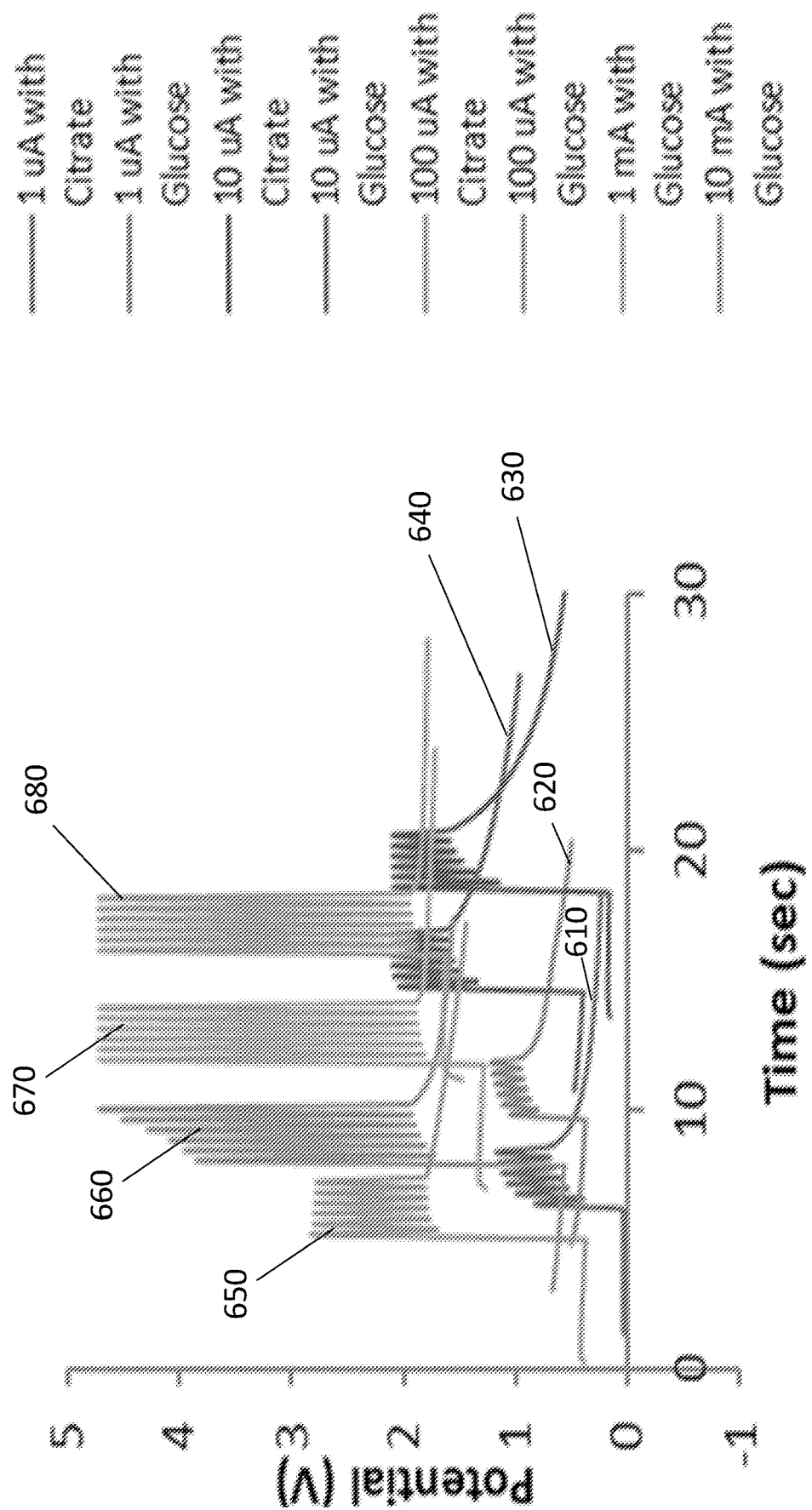
FIG. 6 is a set of Galvanostatic charge and discharge profiles of a supercapacitor provided with different gel electrolytes.

FIG. 6 shows the Galvanostatic charge and discharge profiles of the supercapacitor obtained using the above-mentioned protocol. The measurements were performed using a two electrodes configuration in a Faraday cage in order to minimize interferences. The measurements were performed for charging currents varying from 1 µA to 10 mA and working potential window varying from 1 to 5 V.

Measurements 610, 630 and 650 were obtained for a citrate gel and a charging current of 1 µA, 10 µA and 100 µA respectively. Measurements 620, 640, 660, 670, 680 were obtained for a glucose gel and a charging current of 1 µA, 10 µA, 100 µA, 1 mA, and 10 mA respectively. The capacitance of an electrochemical capacitor may be calculated using the following equation:

$$C = I \frac{dt}{dV(t)} \quad (4)$$

in which C is the capacitance in Farad, I is the charging current, t is the charging time and V is the change in potential on charge.

Capacitance values for different charging current may be obtained using equation 4. For instance, a capacitance of 0.74 mF was calculated for a 10 mA charging current. The pseudocapacitance associated with the reduction of GO adds to the total capacitance of the capacitor.

Figure 7:
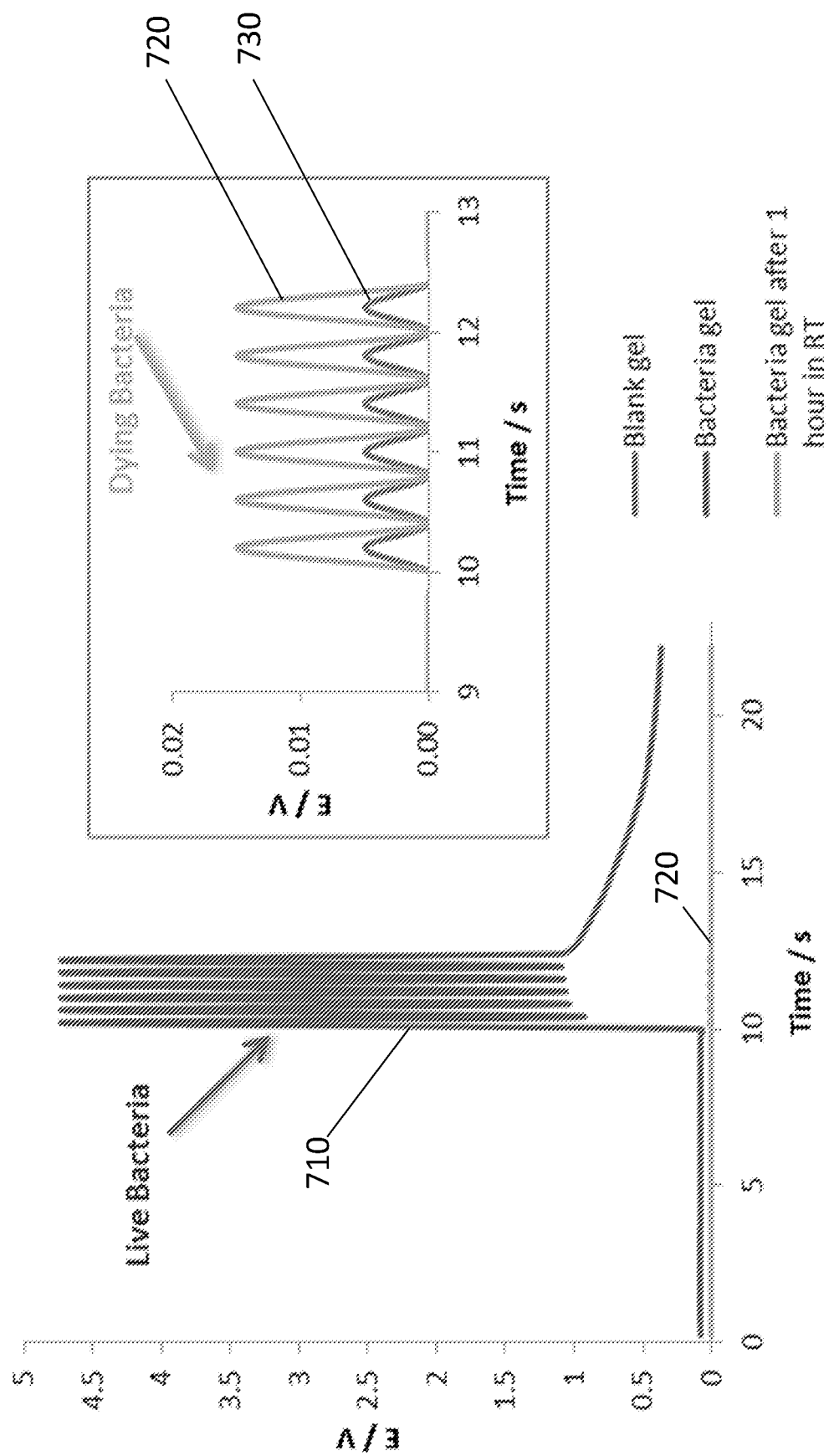
FIG. 7 is a set of charge-discharge measurements obtained for an electrochemical capacitor provided with a biofilm.

FIG. 7 shows the charge-discharge measurements obtained for an electrochemical capacitor provided with a charging current of 10 µA. The measurements were obtained using an electrochemical capacitor as described in FIG. 3 provided with a gel of live bacteria, measurement 710 and a gel of dying bacteria, measurement 720.

The measurement 710 displays six transient pulses having a maximum amplitude of about 4.7 Volts and a full width half maximum of about 300 ms. In contrast, the measurement 720 displays six transient pulses having a maximum amplitude of about 15 mV, hence about 300 times smaller. An additional measurement 730 is provided for a blank gel, hence without bacteria. In this case the discharge pulses have an amplitude of about 4 mV. Therefore, the proposed supercapacitor can be used to destroy a biofilm by providing a succession of short pulses.

A supercapacitor may also be obtained by replacing GO with Manganese dioxide $MnO_2$ deposited on a carbon-based substrate such as a graphite or a Carbone Nanotubes CNTs substrate.

Figure 8:
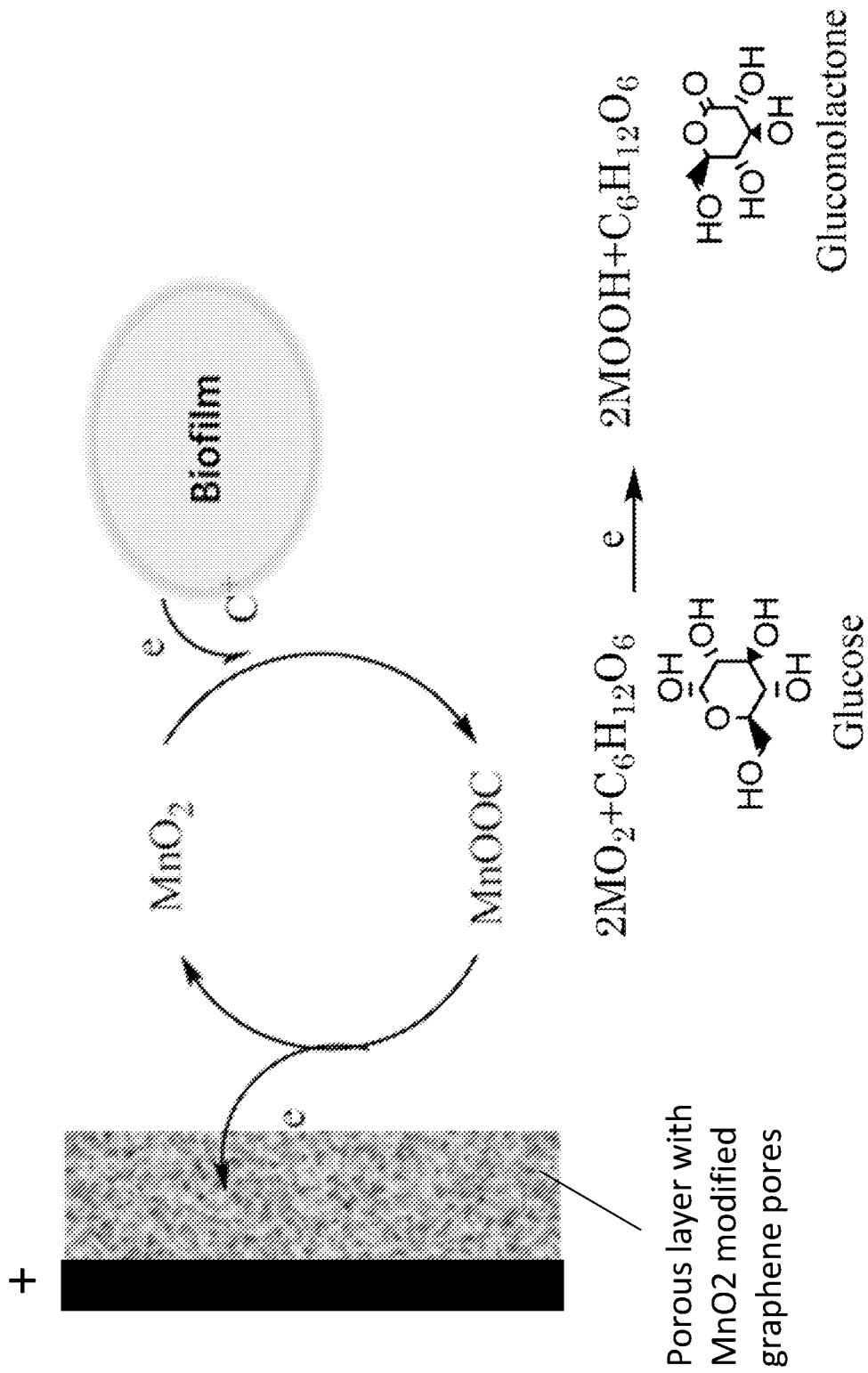
FIG. 8 is a schematic representation of a reaction occurring at the electrode of an $MnO_2$ modified multi walled carbon nanotube supercapacitor.

FIG. 8 is a schematic representation of a reaction occurring at the electrode of an $MnO_2$ modified multi walled carbon nanotube supercapacitor. A biofilm has grown on a redox active layer that includes $MnO_2$ modified graphene pores. The biofilm generates electrons from redox active groups such as phenazines. The electrolyte for instance a glucose gel generates electrons allowing glucose to be transformed into gluconolactone.

Figure 9:
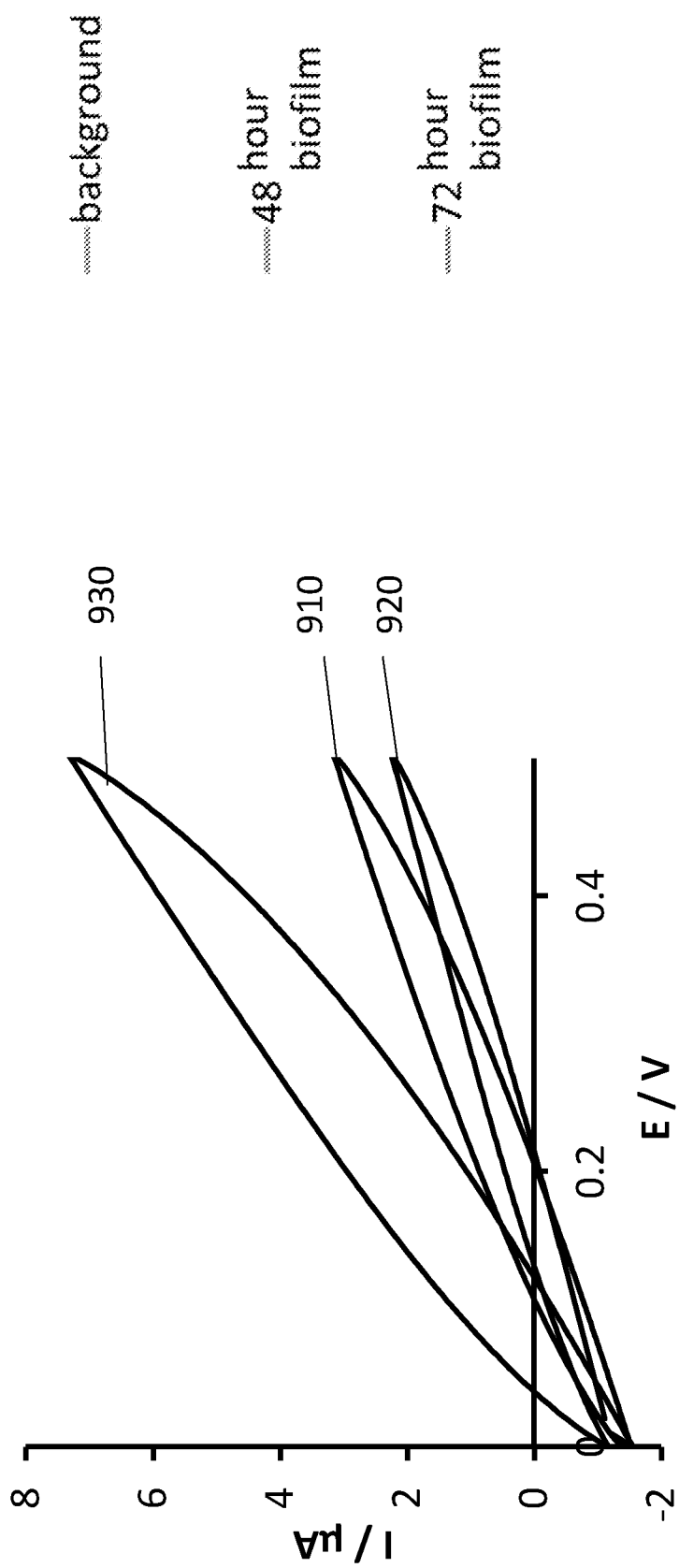
FIG. 9 is a set of cyclic voltammograms obtained for a $MnO_2$ modified carbon nanotube supercapacitor.

FIG. 9 is a set of cyclic voltammograms CVs obtained for an $MnO_2$ modified carbon nanotube supercapacitor. FIG. 9 shows a first CV, 910 obtained before exposure to the bacteria, a second CV 920 obtained after exposing the $CN:MnO_2$ substrate to the bacteria for 48 hours; and a third CV 930 obtained after exposing the $CN:MnO_2$ substrate to the bacteria for 72 hours.

The capacitance of the $CN:MnO_2$ supercapacitor was calculated using equation 3 above. The background capacitance was calculated at $79\pm7$ µF $g^{-1}$ of activated CNT. After 48 hours exposure, the pseudocapacitance of the supercapacitor decreased in the presence of the biofilm down to $51\pm5$ µF $g^{-1}$. This decrease in capacitance implies that the biofilm is impeding the electrical charging of the double layer by blocking the electrode surface. After a 72 hours exposure the capacitance increases to $170\pm9$ µF $g^{-1}$ at the electrode surface. This suggests the establishment of a biofilm that is undergoing quorum sensing and the emergence of redox-active structures.

The emergence of redox-active molecules within the bacterial community facilitates electron transfer to the electrode surface and subsequently contribute to charge storage. A capacitance of 170 µF $g^{-1}$ corresponds to an energy density that is sufficient to power small electronic devices such as a portable/wearable device.

Similar experiments show that the inclusion of $MnO_2$ within a graphite paste increased the pseudocapacitance of the supercapacitor in the presence of a biofilm, from $14.5\pm0.2$ mF $g^{-1}$ for a graphite only electrode to $56.2\pm0.8$ mF $g^{-1}$ for a graphite:$MnO_2$ electrode of ratio 4:1 by mass. This can be attributed to the intercalation redox processes of the electrolyte cations that adsorb onto $MnO_2$ molecules at the surface of the electrode.

The pseudocapacitive nature of $MnO_2$ contributes to charge storage. Compared with graphite electrodes, MWCNTs electrodes have a greater accessible surface area. As a result, MWCNTs provide a greater area over which the double layer can form, leading to increased charge storage.

The electrochemical capacitor described above with reference to FIGS. 3 to 9 may be used in various applications.

Figure 10:
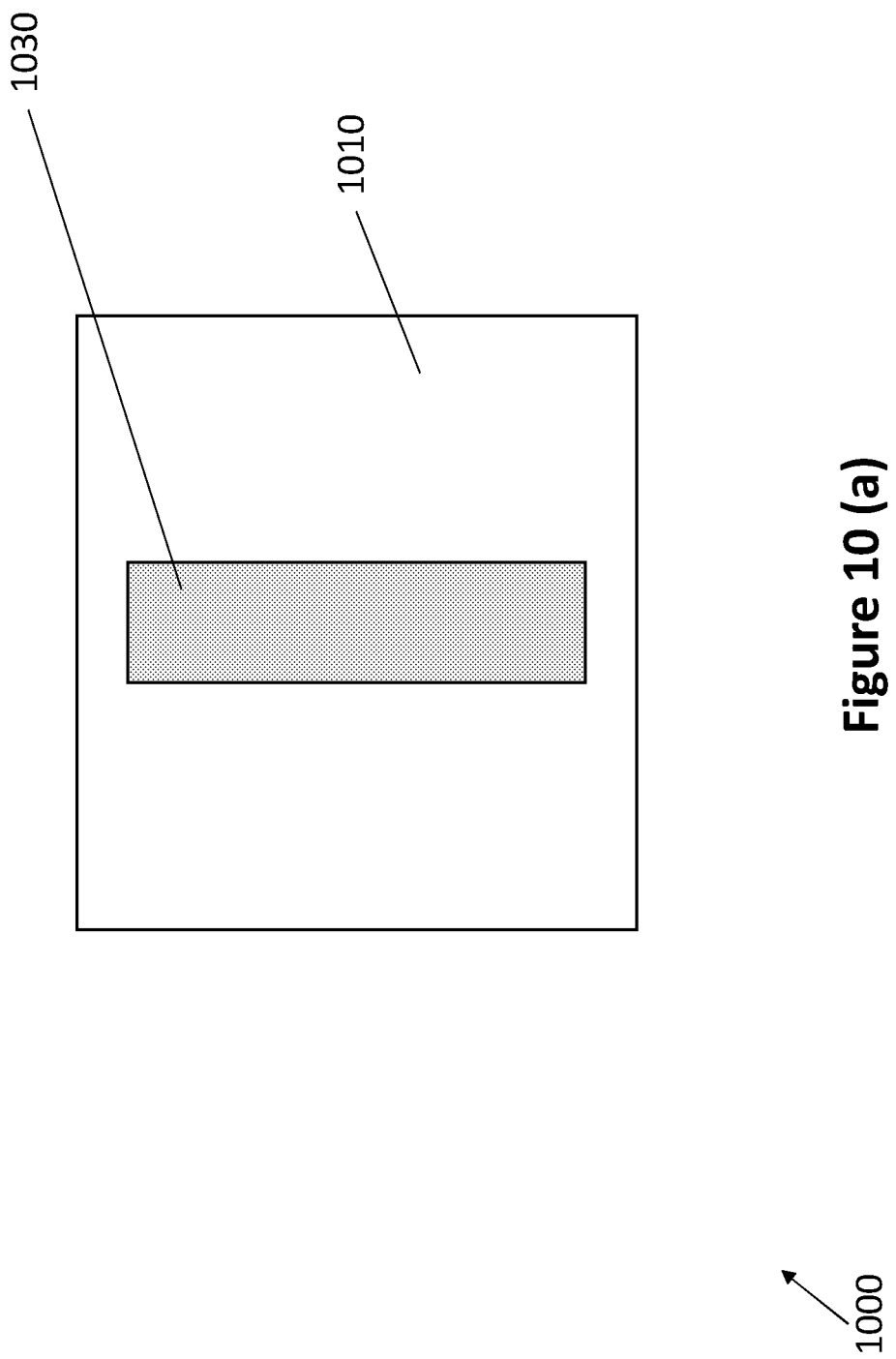
FIG. 10(a) is a bottom view of a skin patch.
FIG. 10(b) is a cutaway view of the skin patch of FIG. 10(a)
Figure 10:
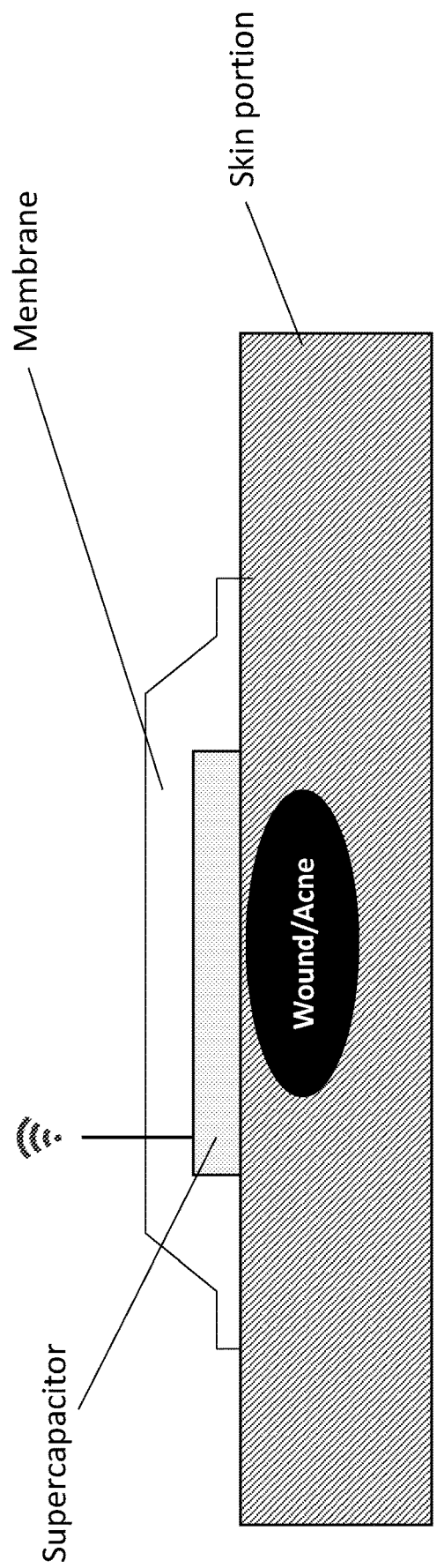

FIG. 10(a) is a bottom view of a patch 1000 to be applied on a skin portion of a subject. FIG. 10(b) is a cutaway view of the patch 1000. The patch has a support layer or membrane 1010 for applying the patch to a skin portion of the subject. One or more supercapacitors 1030 are attached to the membrane 1010. The supercapacitors may be as described with respect to FIG. 3. In an exemplary embodiment the membrane has an adhesive film (not shown) located on its inner surface. The supercapacitor is initially charged with static charges. The patch 1000 does not require any additional battery.

In use the patch 1000 is applied to a skin portion of the subject, for instance the patch may be applied to cover a wound or an inflamed region of the skin. In the presence of bacteria, a biofilm may grow between the electrodes of the supercapacitor. As the biofilm grows, the capacitor generates transient pulses automatically. These pulses disrupt or destroy the biofilm. In turn, the healing of the wound or inflamed skin region is facilitated. Once the biofilm has been destroyed, the amount of redox-active metabolites present in the electrolyte falls below a certain level, and the supercapacitor stops pulsing. The patch 1000 may be a disposable patch for use over a limited time period. In another embodiment a patch may be adapted to sense the formation of a biofilm. In this case the patch would need to be coupled to a current source.

Figure 11:
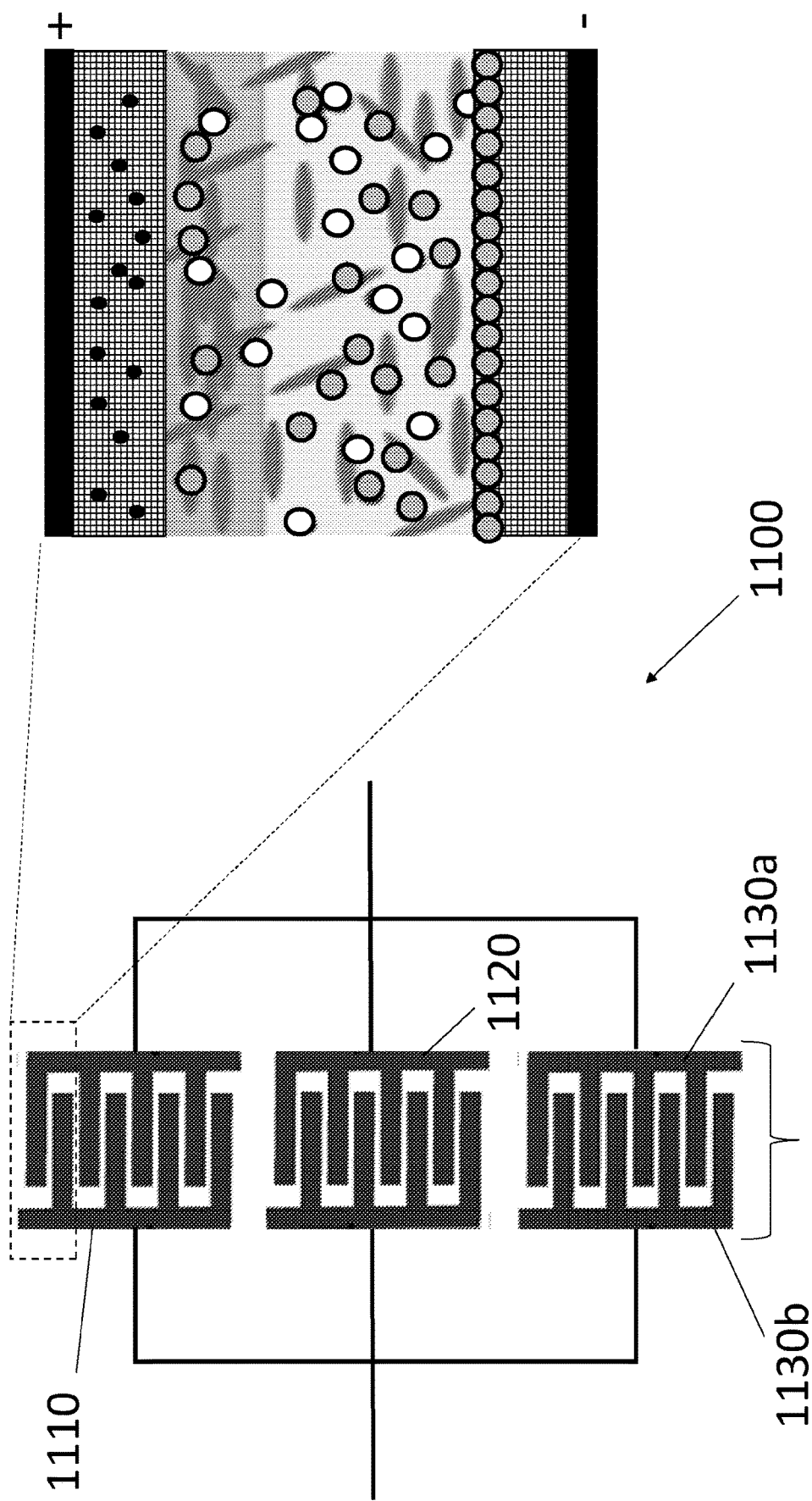
FIG. 11 is an exemplary supercapacitor device for use in the skin patch of FIG. 10.

FIG. 11 illustrates a supercapacitor device 1100 that includes a set of three unit-cells labelled 1110, 1120 and 1130 coupled in parallel. Each unit cell is formed by interdigitated electrodes providing a plurality of pseudo capacitors. In this example, the device includes three unit-cells, however it will be appreciated that more cells can be added depending on the requirements of the application.

The interdigitated electrodes have a first set of parallel arms and a second set of parallel arms. The first set is placed opposite to the second set. For instance cell 1130 includes a first set 1130a to receive a positive current and a second set 1130b to receive a negative current.

Figure 12:
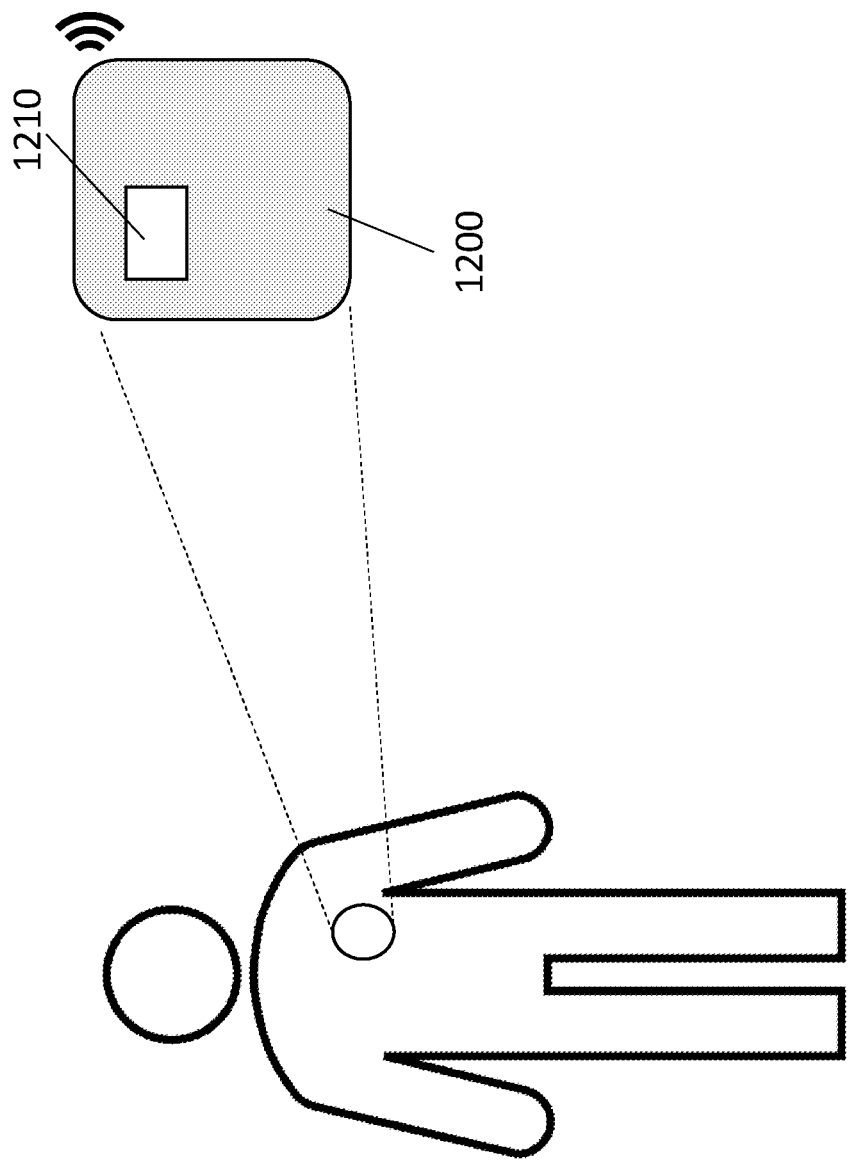
FIG. 12 is an implantable device provided with a supercapacitor.

FIG. 12 is a wireless device, in this example an implantable device 1200 such as a pacemaker. The implantable device 1200 is provided with a power unit 1210. The power unit 1210 includes one or more supercapacitors as described above with respect to FIGS. 3 to 9. The relatively high capacitance value of the supercapacitor describes above makes the supercapacitor an ideal candidate as a power source. The sharp charge and discharge peaks of the supercapacitor provides a large amount of power in a short time, as required by wireless devices. In an exemplary embodiment the supercapacitor includes a biofilm. The supercapacitor uses the redox-active metabolites secreted by the bacteria as a source of energy.

A skilled person will appreciate that variations of the disclosed electrochemical capacitor are possible without departing from the disclosure. Accordingly, the above description of the specific embodiments is made by way of example only and not for the purposes of limitation.

The invention claimed is:

1. An electrochemical capacitor for use with a biofilm, the electrochemical capacitor comprising a first electrode coupled to a first porous layer, a second electrode coupled to a second porous layer; and an electrolyte provided between the first porous layer and the second porous layer; wherein at least one of the first porous layer and the second porous layer comprises a plurality of cavities adapted to receive redox active metabolites produced by the biofilm; wherein the electrochemical capacitor comprises a pseudocapacitance and a double-layer capacitance; and wherein when the biofilm grows between first and the second electrodes the first porous layer stores charges to charge the electrochemical capacitor.

2. The electrochemical capacitor as claimed in claim 1, wherein the first and second electrodes are carbon based.

3. The electrochemical capacitor as claimed in claim 1, wherein the cavities have an average diameter ranging from about 0.2 μm to about 10 μm.

4. The electrochemical capacitor as claimed in claim 1, wherein the first and second porous layers comprise a gel or a polymer.

5. The electrochemical capacitor as claimed in claim 1, wherein the first and second porous layers comprise a nanomaterial or wherein at least one of the first and second porous layers comprise graphene oxide.

6. The electrochemical capacitor as claimed in claim 4, wherein the gel is a polyvinyl alcohol gel.

7. The electrochemical capacitor as claimed in claim 1, wherein the first electrode is an anode and the second electrode is a cathode.

8. The electrochemical capacitor as claimed in claim 7, wherein the first porous layer comprises a redox mediator.

9. The electrochemical capacitor as claimed in claim 8, wherein the redox mediator is manganese dioxide.

10. The electrochemical capacitor as claimed in claim 1, wherein the electrolyte is a biocompatible electrolyte compatible with the formation of the biofilm.

11. The electrochemical capacitor as claimed in claim 10, wherein the electrolyte is a gel.

12. The electrochemical capacitor as claimed in claim 11 wherein the gel comprises at least one of glucose and citrate.

13. The electrochemical capacitor as claimed in claim 1, wherein the electrolyte comprises an ionic liquid.

14. The electrochemical capacitor as claimed in claim 1, wherein at least one of the first and second porous layers comprises an ionic liquid.

15. An electrochemical capacitor device comprising a support layer attached to an electrochemical capacitor as claimed in claim 1.

16. The electrochemical capacitor device as claimed in claim 15, comprising a plurality of interdigitated electrodes forming a plurality of electrochemical capacitors.

17. A skin patch comprising a support layer attached to an electrochemical capacitor for use with a biofilm, the electrochemical capacitor comprising a first electrode coupled to a first porous layer, a second electrode coupled to a second porous layer; and an electrolyte provided between the first porous layer and the second porous layer; wherein at least one of the first porous layer and the second porous layer comprises a plurality of cavities adapted to receive redox-active metabolites produced by the biofilm; and wherein the support layer is adapted to provide adhesion to a skin region of a subject.

18. A power source comprising an electrochemical capacitor as claimed in claim 1 and a biofilm provided between the first electrode and the second electrode of the electrochemical capacitor.

19. A wearable device comprising a power source as claimed in claim 18.

20. Use of an electrochemical capacitor for disrupting or destroying a biofilm, wherein the electrochemical capacitor comprises a first electrode coupled to a first porous layer, a second electrode coupled to a second porous layer; and an electrolyte provided between the first porous layer and the second porous layer; wherein at least one of the first porous layer and the second porous layer comprises a plurality of cavities adapted to receive redox-active metabolites produced by the biofilm; wherein the electrochemical capacitor comprises a pseudocapacitance and a double-layer capacitance; and wherein when the biofilm grows between first and the second electrodes the first porous layer stores charges to charge the electrochemical capacitor.

* * * * *